US006694145B2

United States Patent
Riikonen et al.

(10) Patent No.: US 6,694,145 B2
(45) Date of Patent: Feb. 17, 2004

(54) SYNCHRONIZATION OF SIGNALING MESSAGES AND MULTIMEDIA CONTENT LOADING

(75) Inventors: Arto Riikonen, Espoo (FI); Pekka Salomo Immonen, Lepsämä (FI)

(73) Assignee: Nokia Corporation, Espoo (FI)

( * ) Notice: Subject to any disclaimer, the term of this patent is extended or adjusted under 35 U.S.C. 154(b) by 151 days.

(21) Appl. No.: 10/026,912

(22) Filed: Dec. 27, 2001

(65) Prior Publication Data

US 2003/0123488 A1 Jul. 3, 2003

(51) Int. Cl.[7] .............................................. H04B 15/00
(52) U.S. Cl. ...................................... 455/502; 370/503
(58) Field of Search ................................ 455/502, 436, 455/408, 560, 445, 461, 517, 433; 370/503, 509, 351, 352, 353, 354, 355, 356, 400, 401, 328, 338, 350; 725/76, 109; 709/233

(56) References Cited

U.S. PATENT DOCUMENTS

| | | | | |
|---|---|---|---|---|
| 5,941,951 A | * | 8/1999 | Day et al. ..................... | 709/233 |
| 5,978,589 A | * | 11/1999 | Yoon .......................... | 395/712 |
| 6,366,577 B1 | * | 4/2002 | Donovan ..................... | 370/352 |
| 2002/0103830 A1 | * | 8/2002 | Hamaide et al. ............. | 707/513 |
| 2002/0131395 A1 | | 9/2002 | Wang ......................... | 370/349 |
| 2002/0160810 A1 | * | 10/2002 | Glitho et al. ............... | 455/560 |
| 2002/0178451 A1 | * | 11/2002 | Ficco ......................... | 725/76 |
| 2002/0181462 A1 | | 12/2002 | Surdila et al. .............. | 370/392 |
| 2002/0188954 A1 | * | 12/2002 | Matous et al. .............. | 725/109 |
| 2003/0087645 A1 | * | 5/2003 | Kim et al. ................... | 455/453 |
| 2003/0092444 A1 | * | 5/2003 | Sengodan et al. .......... | 455/436 |
| 2003/0114142 A1 | * | 6/2003 | Brown et al. ............... | 455/408 |
| 2003/0123488 A1 | * | 7/2003 | Riikonen et al. ........... | 370/503 |

* cited by examiner

Primary Examiner—Nay Maung
Assistant Examiner—Tan Trinh
(74) Attorney, Agent, or Firm—Brown Raysman Millstein Felder Steiner

(57) ABSTRACT

A method synchronizes signaling messages and multimedia content loading at a callee terminal. A first signaling message transmitted from a caller terminal to initiate a multimedia session establishment is processed to detect, in the first signaling message, information indicating that the multimedia content should be presented in synchronization with a second signaling message necessary to session establishment. The multimedia content is downloaded and presented in accordance with the information indicating that the multimedia content should be presented in synchronization with said second signaling message necessary to session establishment. The second signaling message necessary to session establishment is delayed until after the step of downloading and presenting the multimedia content in accordance with the information indicating that the multimedia content should be presented in synchronization with the second signaling message is completed.

39 Claims, 3 Drawing Sheets

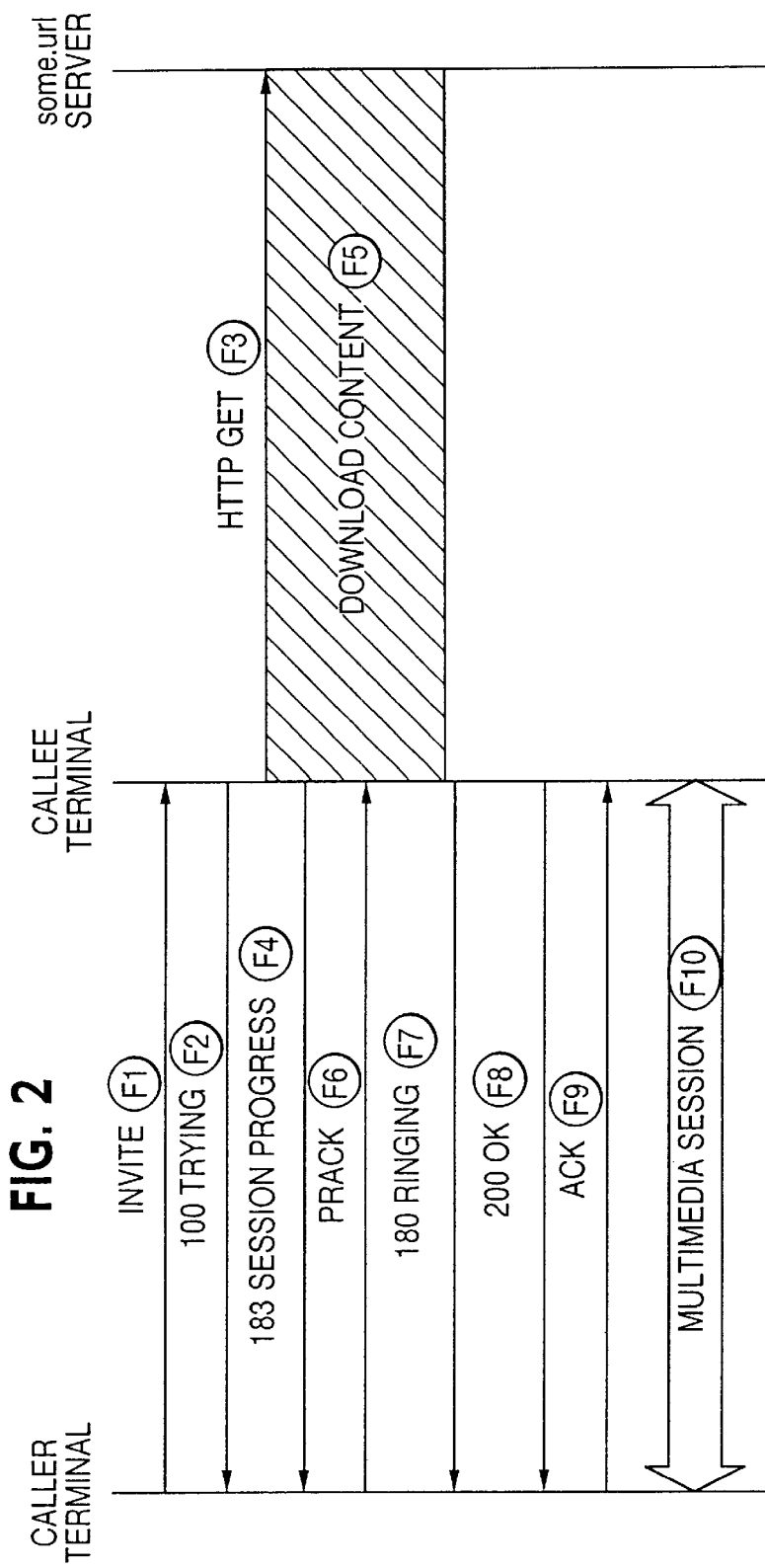

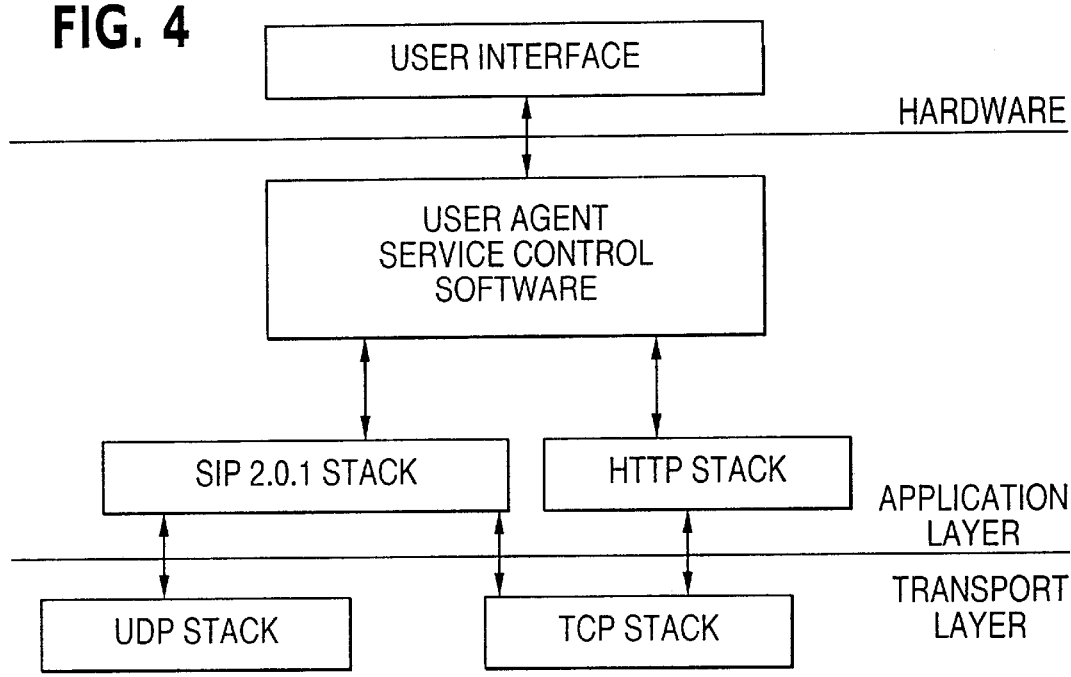
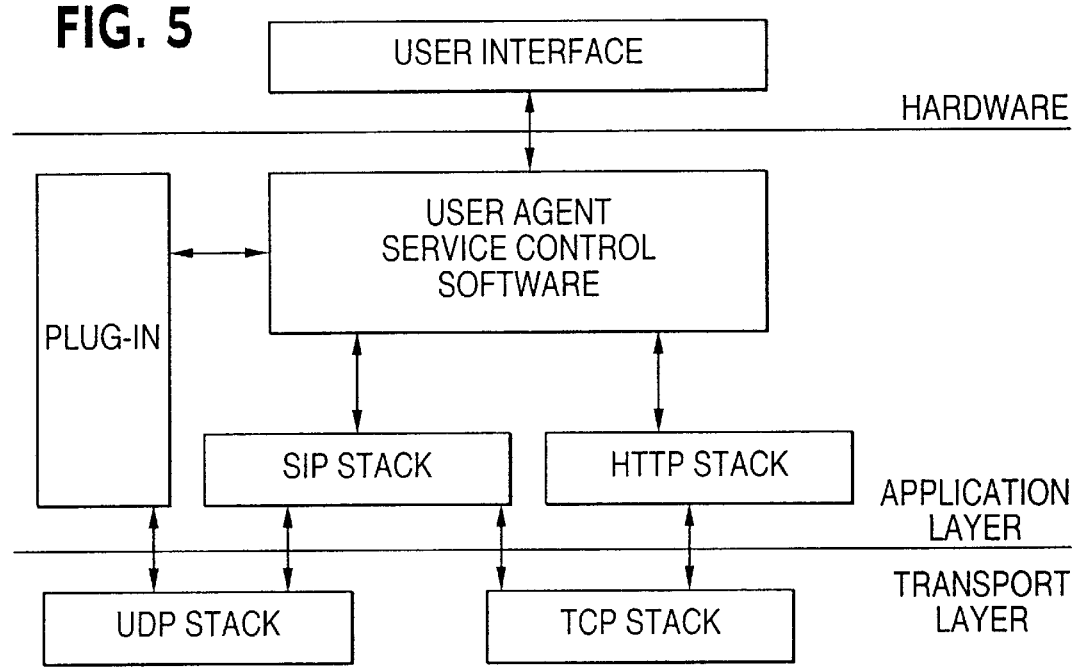

SYNCHRONIZATION OF SIGNALING MESSAGES AND MULTIMEDIA CONTENT LOADING

BACKGROUND

1. Field of the Invention

The present invention relates generally to the field of communications. In particular, the invention relates to the use of signaling messages in multimedia communications.

2. Discussion of the Related Art

There are numerous network transport protocols that carry various forms and combinations of multimedia content such as voice, video, web content, graphics and text. Signaling messages work in concert with these transport protocols by enabling terminals on communications networks to contact one another and agree on the parameters of a multimedia session they would like to share. A session is considered to be any exchange of data between two or more terminals.

A recent example of signaling messages is the Session Initiation Protocol (SIP) developed by the Internet Engineering Task Force Version 2.0 of SIP was published by the IETF in 1999 as RFC 2543. An Internet-Draft containing bug fixes and clarifications to SIP 2.0 was published in 2000 as RFC 2543bis. Since then, there have been a few revisions of SIP 2.0 and there are likely to be more revisions and backwardly compatible extensions of SIP 2.0 in the future. For the sake of simplicity all such known and future revisions and backwardly compatible extensions of SIP 2.0 will be referred to in this application simply as "SIP" or "SIP 2.0".

A variety of SIP messages are used to establish, modify, and terminate multimedia sessions. The names and numbers of the messages are defined in RFC 2543bis. A SIP multimedia session can be a conference, but is not necessarily a conference. Common examples of SIP multimedia sessions are Internet telephony calls, video streaming, etc. SIP is an application-layer protocol that works without dependency on the type of session that is being established. Like the Hypertext Transfer Protocol (HTTP), SIP is based on a request/response transaction model. Each transaction consists of a request that evokes a particular method or function and at least one response.

A variety of multimedia communication services may be implemented using SIP application servers and SIP messages to setup and control the sessions. A SIP message can also can be used to carry content payloads (MIME types such as JPEG) inside the message without having to first set up a multimedia session. This offers the possibility of providing push or push-like "non-call" services such as instant messaging. For example, even though the SIP INVITE message is a signaling message, it may be used for this purpose. MIME-payloads such as image/jpeg or audio/midi may be included in one INVITE message. Other SIP message types (e.g. INFO) may also be used and new message types may be defined for the purpose of providing payload without setting up a multimedia session.

FIG. 1 shows a simple method of using the SIP INVITE message to send data without setting up a multimedia session. First, User A sends a SIP INVITE message (F1) to User B which includes a payload inside it. User B responds by returning "100 Trying" (F2), "180 Ringing" (F3), and "200 OK" (F4), which confirms receipt of the message. User A then sends a "BYE" message (F5), to User B which acknowledges this message by returning "200 OK" (F6). This method has the disadvantage that it can create significantly increased signaling load. When used in conjunction with the User Datagram Protocol (UDP), RFC 768, the method has the further disadvantage that the SIP messages cannot carry attachments which are larger than about 1.5 KB. Message segmentation or transport using the Transport Control Protocol (TCP) are also undesirable. Furthermore, there can be some content, such as some of that on the World Wide Web, which cannot be utilized any other way than by using a Uniform Resource Locator (URL), RFC 1738.

RFC 2543.bis and WO 00/51306 describe a system in which a URL may be placed in a SIP message instead of a payload and the user receiving the SIP message containing the URL obtains the data from the server corresponding to the URL and presents it to the user. This URL is the same as that used by other Internet protocols. The domain name in the URL may be that of the person sending the SIP message, a SIP service provider, a third party, etc. Unfortunately, the manner and duration of the procedure necessary for obtaining the data may vary widely and unpredictably. The procedure may be affected by such factors as, for example, the type and amount of data, the bandwidth capacity of the network of either the user or the server corresponding to the URL, etc. The procedure may be especially slow, sporadic and/or unreliable in wireless communication networks. As a result, the loading and presenting of the data may be completed and occur during any one of the phases of the call establishment setup. For example, the data may be loaded and presented either: before the 180 Ringing message (F3); between the 180 Ringing message (F3) and the 200 OK message (F4); or after the 200 OK message (F4). It is even possible that, if the session is short and the download takes a long time, the download might not even be completed before the session is terminated. This may be undesirable since the data may be presented to the user at different times in different sessions. The situation where the downloaded content is presented a considerable length of time after the phone starts to ring is particularly undesirable.

The problem is exacerbated in third generation (3G) wireless communication networks supporting advanced mobile terminals and allowing a user to subscribe to and access a variety of different multimedia communication services. An advanced mobile terminal supported by such a network and using the latest innovations in computers, software, displays and other technologies may access and receive many different multimedia formats. These multimedia services may be provided by different information sources in other networks and may be based on and built upon a variety of data transfer techniques. This introduces more delay and uncertainty into the procedure associated with loading and presentation of data located at a URL included in a SIP message.

For at least these reasons, present methods of utilizing SIP to transfer multimedia content have disadvantages, especially for user terminals supporting may different types of communications services or in certain types of networks, such as wireless communication networks. Accordingly, there is a need for an effective solution that allows for synchronization of SIP messages and multimedia content loading.

BRIEF SUMMARY

It is therefore an object of the following described example embodiments to overcome the above mentioned disadvantages. In particular, an object of the example embodiments is to provide a solution which facilitates synchronization of signaling messages and multimedia content loading in a user terminal.

In the example embodiments, the URL necessary for obtaining multimedia content from a server or other network element maintaining the content is included in a first signaling message. The user terminal receiving the first signaling message is able to communicate with the server or other network element as desired to synchronize the loading and presentation of the multimedia content according to other information provided to the user terminal in the first signaling message.

A particular aspect of the example embodiments involves an extension to SIP INVITE messages that allows the downloading and presentation of the multimedia content to be controlled by requesting that it be synchronized with a particular SIP message in a call set-up procedure. A user agent in the user terminal receiving the SIP INVITE message responds by sending messages to a URL and as necessary according to a protocol designated in the SIP INVITE message and coordinating the downloading and presentation of the content. The user agent in the terminal may coordinate all of the ongoing messages. The messages used to download the content may be of a type or in accordance with a protocol or otherwise of a manner useful or necessary for communications that differs from SIP messages.

A particularly useful application of the example embodiments is in a service in which a specific piece of multimedia information is downloaded and presented on the user terminal without being initiated by the user and at the same time that the user is alerted of the request for a session. The user terminal exchanges messages with a network entity which manages the multimedia information without the knowledge of the user. According to such an application of the example embodiments, the multimedia information appears, from the perspective of the user, to have been received from the caller simultaneously with the request for a session.

BRIEF DESCRIPTION OF THE DRAWINGS

A more complete appreciation of the example embodiments, and many of the attendant advantages thereof, will become readily apparent as the same becomes better understood by reference to the following detailed description when considered in conjunction with the accompanying drawings, wherein:

FIG. 2 is a flow diagram of an example method of synchronizing SIP messages and multimedia content according to an example embodiment.

FIG. 3 is an example of SIP INVITE message F1 in the flow diagram of FIG. 2.

FIG. 4 is a first example of part of the software architecture of a user terminal which may be used to perform any of the example embodiments disclosed herein.

FIG. 5 is a second example of part of the software architecture of a user terminal which may be used to perform any of the example embodiments disclosed herein.

DETAILED DESCRIPTION

Figure 1:
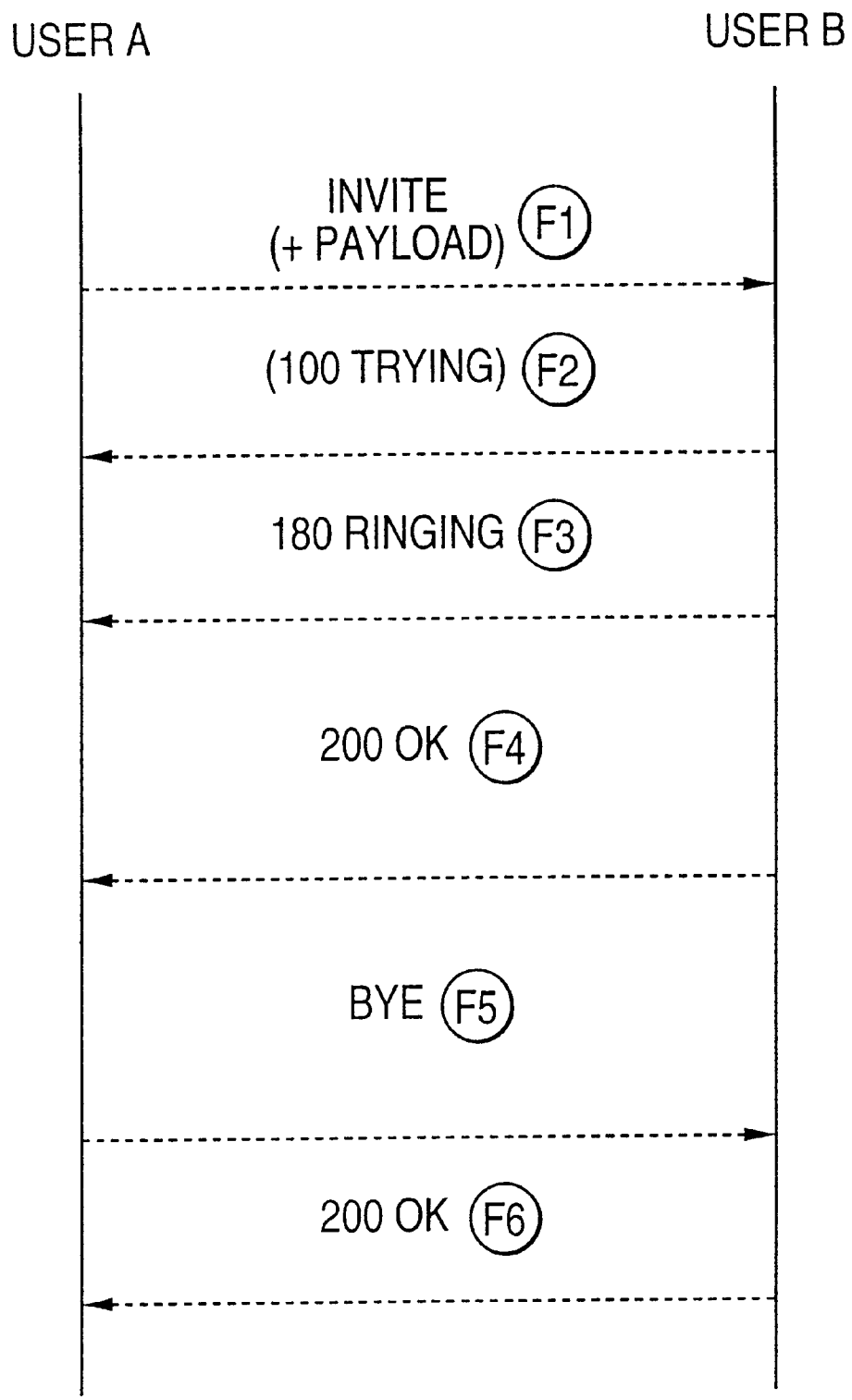
FIG. 1 shows an example of the SIP signaling messages transferred between users in a method in which a payload is included in the SIP INVITE message.

The example embodiments use a new, specially designated header in the SIP INVITE message to have the loading and presentation of multimedia information synchronized in a user's terminal. Attention now is directed to the drawings and particularly to FIG. 2, which shows the flow diagram for a method according to the example embodiments, keeping in mind that the example embodiments may be carried out between a variety of different types of network entities and in a variety of different networks.

Although FIG. 2 refers to user terminals, it should be understood that the method according to the example embodiments may in fact be provided by a SIP application server located in the same network as one of the terminals or in another network or on the Internet. The communication services made available by such an SIP application server may include SIP services other than those which use the method according to the example embodiments. It should also be understood that any one of the terminals may use a proxy server, especially if the terminal is a mobile terminal in a wireless communication network.

As illustrated in FIG. 2, the method begins with the caller terminal sending a SIP INVITE message (F1). An example of the SIP INVITE message (F1) in shown in FIG. 3. Like conventional SIP INVITE messages, SIP INVITE message (F1) includes the start line and the "Via", "To", "From", "Call-ID", and "C-Seq" headers. In addition, the SIP INVITE message (F1) also includes a new header designated, merely as an example, as "SynchronizeLoading". This header contains a URL and the number of a designated SIP response message. The header may have the URL and the number of the designated SIP response message separated by a space from each other as illustrated in FIG. 3, but another syntax can be used as well. In the example of FIG. 3, the URL is listed as "some.url" and the designated SIP response message is the 180 Ringing message. It is also possible that the URL is located in the payload and that the "SynchronizeLoading" header contains only the information designating the message with which the payload should be synchronized.

Upon receipt of the SIP INVITE message (F1), the callee terminal immediately returns a 100 trying response message (F2) just as it would for any other SIP INVITE message (F1). However, the user agent in the callee terminal, upon detecting the "SynchronizeLoading" header in the SIP INVITE message (F1), begins a process of downloading and presenting multimedia content according the URL in the "SynchronizeLoading" header. In the example shown in FIGS. 2 and 3, the URL is "http:/some.url". So the user agent sends a HTTP GET message (F3) to the location "some.url" to begin the process of downloading the multimedia content therefrom. If another protocol such as FTP (file transfer protocol) is designated, then the user agent would instead use the initial message appropriate to begin downloading the content according to such a protocol. As indicated above, several factors may affect the download process (F5). The amount of time and the number and variety of signaling messages necessary to download the multimedia content may vary greatly from session to session. For ease of illustration, FIG. 2 illustrates the download process as a lined block (F5).

After sending the HTTP GET (F3) or other initial message to the URL to begin the download process, the user agent in the callee terminal sends a 183 session progress message (F4). This type of SIP response message indicates that information about the progress of the session (call state) is present in the message body. A conventional use of a 183 session progress message is to provide a ring tone, welcome screen, recorded announcement, etc, to the caller terminal so that the caller knows that the session is progressing. In the method according to the example embodiments, the 183 session progress message (F4) may inform the caller of the fact that the download process (F5) has begun. Preferably, because of the desire for synchronization in the method according to the example embodiments, the caller terminal returns a PRACK message (F6) to acknowledge receipt of the 183 session progress message (F4). Although not shown in FIG. 2, the method according to the example embodiments may continue certain parts of call set up such as sending COMET messages and negotiating SDP (session description protocol) parameters during download process (F5).

In the method according to the example embodiments, the download process (F5) is controlled so that the presentation of the downloaded multimedia content is synchronized to occur simultaneously with the SIP response message designated in the "SynchronizeLoading" header of the SIP INVITE message. In the example shown in FIGS. 2 and 3, the 180 ringing message is designated and the downloaded multimedia content is synchronized to be presented simultaneously with the transfer of the 180 ringing message (F7) from the callee terminal to the caller terminal and the corresponding alerting of the callee. This means that the 183 ringing message (F7) is delayed until the downloading and presentation is complete. From the perspective of the callee, the downloaded information is received at the same time as the alert or just prior to the alert and appears to be received directly from the caller. The manner of presentation corresponds to the downloaded multimedia content and would consist of audio only if the content was audio only, video only if the content was video only, etc.

The multimedia content to be downloaded may take a variety of forms and be in any number and combination of multimedia formats (video, audio, web graphics, animation, etc.). The content may serve a variety of informational purposes. It may, for example, announce the identity of the caller or service, either with text, audio, video or graphics. The information may be, for example, the electronic equivalent of a business card or a greeting or welcome screen. If the method is implemented in a service providing, for example, sports scores, the downloaded information could be a logo of the callee's favorite sports team, etc. The downloaded information could be a document or other information that the caller wishes to discuss with the caller in the requested communication session. The downloaded information could also be "default" service information providing the callee with, for example, a menu providing the various service options (answer the call, take a message, forward call, etc.).

After the 180 ringing message (F7), the remainder of the method is similar to the conventional method. It includes a 200 OK message (F8) from the callee terminal to the caller terminal, an ACK message (F9) from the caller terminal to the callee terminal recognizing the 200 OK message (F8) and the multimedia session itself (F10). It should be kept in mind that the "SynchronizeLoading" header in the SIP INVITE message may designate the 200 OK message (F8) rather than the 180 ringing message (F7) and thus the 200 OK message (F8) rather than the 180 ringing message (F7) would be delayed until the downloading and presentation of the multimedia content is complete.

Preferably, the user agent of the callee terminal contains a timer which limits the maximum amount of time that the designated 180 ringing message or 200 OK message may be delayed from the beginning of the download process. This prevents the user agent from being blocked if an error or exception condition occurs during downloading or presentation of the multimedia content. The user agent of the callee terminal may also immediately terminate the delay of the designated 180 ringing message or 200 OK message if an error or exception condition occurs during downloading or presentation of the multimedia content.

The method described with respect to FIG. 2 may be advantageously applied by a SIP application server or proxy server to provide push or push-like services either with or without setting up a multimedia session (F10). The SIP application server or proxy server may maintain and provide the services (e.g., user subscriptions, content information and storage location) or act as a gateway between callers/service providers by providing the SIP INVITE message modified from a conventional SIP INVITE message as described above to the callees. In such an arrangement, only the SIP application server or proxy server and the callee terminals would need to be able to carry out the method according to the example embodiments. The caller terminals/service providers would not have to include the functionality.

An important aspect of the example embodiments is that the caller terminal can make the desired multimedia content easily available to the callee terminal at the most opportune time using a "SynchronizeLoading" header in the SIP INVITE message. Preferably, the network operator or other party can manage the services utilizing the method according to the example embodiments so that the callee is not exposed to undesirable or objectionable material.

Another advantage is that the method according to the example embodiments involves only a minor extension of the SIP 2.0 specifications in the form of a simple header at the callee terminals (and to a SIP application server). FIGS. 4 and 5 illustrate two examples of a relevant part of the software architecture in the callee terminal. In the first example shown in FIG. 4, the user agent utilizes a modified version of the conventional SIP 2.0 protocol stack in the user agent of the callee terminal which includes additional support for the SynchronizeLoading" header (this modified version being referred to as SIP 2.0.1). The SIP 2.0.1 stack continues to work in concert with the UDP or TCP transport protocols and the User Agent Service Control Software to carry out the method shown in FIG. 2. Another protocol stack, such as an HTTP stack, is utilized to download the multimedia content and present it on the user interface of the callee terminal. Preferably, known APIs (application programming interfaces) are employed between the various software modules shown in FIG. 4.

Recognizing that it may be desirable to use the method according to the example embodiments in terminals such as mobile phones which already contain a SIP 2.0 stack, FIG. 5 illustrates a second example of the software architecture of a user agent in a callee terminal. In this second example, a separate software module, such as a plug-in, is added to the user agent to provide the extension to the SIP 2.0 protocol stack and to carry out the method according to the example embodiments illustrated in FIG. 2. Such an arrangement makes it unnecessary for a person to replace a terminal having a SIP 2.0 protocol stack with a new terminal having native supporting for the SIP extension and method described herein. The software plug-in preferably uses conventional APIs to communicate with the SIP 2.0 stack and the User Agent Service Control Software.

The method according to the example embodiments is applicable for use with all types of networks and interconnected systems using SIP for multimedia sessions of voice, message, data and image between terminals. Such networks may include, for example, the Internet, local area networks (LANs) whether Ethernet or wireless, cellular and other wireless communication networks, such as bluetooth and Wideband CDMA (WCDMA) networks. SIP transparently supports name mapping and redirection services, which makes it well suited for wireless communication networks (i.e., users can maintain a single externally visible identifier (i.e., SIP Uniform Resource Identifier (URI)) regardless of their network location. Technical Specification TS 23.228 V5.0.0 of the 3rd Generation Partnership Project (3GPP), discloses a 3G wireless communication network (hereinafter referred to simply as the "3G network") including an Internet Protocol Multimedia Core Network Subsystem (IMS) able to support SIP messaging for multimedia communication services and which is hereby incorporated by reference in its entirety as an example network environment in which the example embodiments may be implemented. The 3G network has a Home Subscriber Server (HSS) containing user related information such as user identification (UserID), numbering, address information, and a user profile including, for example, subscription information, services and service specific information. In addition to knowledge about ongoing communication services, there may also be other information, such as numerous parameters and/or settings, needed by the user terminal to receive those communication services. The parameters and/or settings may include for instance communication networks parameters, such as General Packet Radio Service (GPRS) parameters or Universal Mobile Telecommunication System (UMTS) parameters, Wireless Application Protocol (WAP) parameters comprising a WAP Gateway address a Uniform Resource Locator (URL) for setup, a home page and favorites, World Wide Web (WWW) parameters comprising a Hyper Text Transfer Protocol (HTTP) proxy address, SMTP/POP3 addresses, public keys, Ipv4, Ipv6, and a Default Classmark for multi-classmark devices. There may also be general information, such as network subscription and authorization information or calling plan information or lists of telephone numbers, stored in the user terminal and which is desired to be available to the user to enable or facilitate communications. The 3G network also has a Serving Call Session Control Function (S-CSCF) which provides call control, session control and service control for user terminals. Other than the interface to HSS, S-CSCF utilizes the Session Initiation Protocol (SIP) or an extension or backward compatible revision thereof for all connections to other network elements. When a terminal is visiting a network other than its home network, the visited network preferably utilizes a Proxy Call Session Control Function (P-CSCF) that enables the session control to be passed to the home network based S-CSCF providing service control for the terminal. A SIP Application Server may be located within the IMS and connected directly to S-CSCF or to a P-CSCF to provide various SIP multimedia communication services as described above.

Of course, in a particular implementation, a user in a network is likely to receive a combination of different services. However, as described, the method according to the example embodiments can be used only for selected services or even for only selected sessions of a service as determined by a SIP application server. As can be seen from the foregoing, using a special header in the SIP INVITE message yields a fast and efficient solution for downloading and presenting multimedia information in synchronization with a session. While the invention has been described with reference to example embodiments, the description is illustrative and is not to be construed as limiting the invention. In particular, the various references to user agents and user terminals refers merely to the terminology used in association with SIP and is not meant to imply that the method according to the example embodiments must only be used with certain types of network elements.

What is claimed is:

1. A method of synchronizing signaling messages and multimedia content loading, comprising:
   at a callee terminal, processing a first signaling message transmitted from a caller terminal to initiate a multimedia session establishment by detecting, in said first signaling message, information indicating that said multimedia content should be presented in synchronization with a second signaling message necessary to session establishment;
   downloading and presenting said multimedia content in accordance with said information indicating that said multimedia content should be presented in synchronization with said second signaling message; and
   delaying said second signaling message necessary to session establishment until after completing said step of downloading and presenting said multimedia content in accordance with said information indicating that said multimedia content should be presented in synchronization with said second signaling message.

2. A method in accordance with claim 1 wherein said first signaling message and said second signaling message respectively comprise a first SIP message and a second SIP message.

3. A method in accordance with claim 2 wherein:
   the first SIP message is a SIP INVITE message.

4. A method in accordance with claim 1 wherein:
   a header in said first signaling message designates said second signaling message necessary for session establishment.

5. A method in accordance with claim 4 wherein:
   said at least one message downloading the multimedia information uses a protocol other than the protocol used in said first signaling message.

6. A method in accordance with claim 4 wherein:
   the callee terminal is a mobile terminal is a wireless communication network.

7. A method in accordance with claim 4 wherein:
   the header in said first signaling message contains the address of said multimedia content.

8. A method in accordance with claim 6 wherein:
   the wireless communication network is a 3G network providing a plurality of different multimedia services.

9. A method in accordance with claim 8 wherein:
   at least two of said plurality of different multimedia services differ from each other in the manner in which multimedia content is downloaded to a user terminal.

10. A method in accordance with claim 4 wherein:
    the address of said multimedia content is a universal resource locator (URL) contained in the payload of said first signaling message.

11. A method in accordance with claim 7 wherein:
    the address is a universal resource locator (URL).

12. A method in accordance with claim 1 wherein:
    the multimedia content is related to the caller.

13. A method in accordance with claim 12 wherein:
    the multimedia content identifies the caller.

14. A method in accordance with claim 1 wherein:
    the multimedia content is downloaded from a network other than the network in which the callee terminal is located.

15. A method in accordance with claim 2 wherein:
said second SIP message necessary for session establishment is a 180 ringing message.

16. A method in accordance with claim 2 wherein:
said second SIP message necessary for session establishment is a 200 OK message.

17. A method in accordance with claim 3, wherein:
the SIP INVITE message is transmitted through a SIP application server or a proxy server.

18. A method in accordance with claim 1, wherein:
the address of said multimedia content is included with said first signaling message transmitted to the callee terminal;
the callee terminal sends at least one message to the address; and
said at least one message downloads the multimedia content to the callee terminal from the address.

19. A mobile terminal in a wireless communication network comprising:
a user agent which processes a first signaling message during session establishment to detect, from the first signaling message, information indicating that multimedia content should be downloaded and presented to the user in synchronization with a second signaling message necessary to session establishment; and
a protocol stack downloading and presenting said multimedia content in accordance with said information indicating that multimedia content should be downloaded and presented to the user in synchronization with said second signaling message necessary to session establishment; wherein
session establishment is completed by said user agent only after said multimedia content is downloaded and presented to the user in synchronization with said second signaling message necessary to session establishment.

20. A mobile terminal in accordance with claim 19 wherein said first signaling message and said second signaling message respectively comprise a first SIP message and a second SIP message and said user agent comprises a SIP user agent.

21. A mobile terminal in accordance with claim 19 wherein:
said multimedia content is stored at an addressable location and an address of where the multimedia content is stored is included with said first signaling message.

22. A mobile terminal in accordance with claim 19 wherein:
the first signaling message is a SIP INVITE message.

23. A mobile terminal in accordance with claim 20 wherein:
said protocol stack is a protocol stack other than a SIP protocol stack.

24. A mobile terminal in accordance with claim 23 wherein:
said protocol stack is a HTTP protocol stack.

25. A mobile terminal in accordance with claim 20 wherein:
said SIP user agent sends a 183 session progress message when said multimedia content is being downloaded.

26. A mobile terminal in accordance with claim 25 wherein:
said SIP user agent detects the presence of a header containing said information indicating that multimedia content should be downloaded and presented to the user in synchronization with said second SIP message necessary to session establishment.

27. A mobile terminal in accordance with claim 26 wherein:
said header designates said second SIP message necessary to session establishment.

28. A mobile terminal in accordance with claim 27, wherein:
said header contains the address of said multimedia content.

29. A mobile terminal in accordance with claim 28, wherein:
the address is a universal resource locator (URL).

30. A mobile terminal in accordance with claim 27, wherein:
the address of said multimedia content is a universal resource locator (URL) contained in the payload of said first signaling message.

31. A mobile terminal in accordance with claim 20 wherein:
said second SIP message necessary to session establishment is a 180 ringing message.

32. A mobile terminal in accordance with claim 20 wherein:
said second SIP message necessary to session establishment is a 200 OK message.

33. A network element in a communications network, said network element performing a synchronization method comprising:
receiving a first signaling message transmitted from a caller terminal, said first signaling message initiating a multimedia session between said caller terminal and said callee terminal;
detecting information in said first signaling message indicating the location of multimedia content to be downloaded by said callee terminal;
modifying said first signaling message to include information indicating that said multimedia content should be presented on said callee terminal in synchronization with a second signaling message related to said multimedia session; and
forwarding said modified first signaling message to said callee terminal.

34. A network element in accordance with claim 33, wherein said first signaling message and said second signaling message respectively comprise a first SIP message and a second SIP message.

35. A network element in accordance with claim 34, wherein said network element comprises a SIP application server.

36. A network element in accordance with claim 35, wherein said SIP application server maintains and provides multimedia communications services to said callee terminal, and carries out said synchronization method for at least one of said multimedia communications services.

37. A network element in accordance with claim 36, wherein said at least one of said multimedia communication services comprises a push service.

38. A network element in accordance with claim 33, wherein said network element comprises a proxy server for said callee terminal.

39. A network element in accordance with claim 33, wherein at least one of said network element, callee terminal or multimedia content is located in a wireless communication network.

* * * * *